United States Patent
Lee et al.

(10) Patent No.: US 12,293,374 B2
(45) Date of Patent: May 6, 2025

(54) URGENCY-BASED QUEUE MANAGEMENT SYSTEMS AND METHODS

(71) Applicant: Capital One Services, LLC, McLean, VA (US)

(72) Inventors: Jonathan Lee, Kitchener (CA); Elijah Moreau-Arnott, Guelph (CA); Garrett Randall, Corunna (CA)

(73) Assignee: CAPITAL ONE SERVICES, LLC, McLean, VA (US)

( * ) Notice: Subject to any disclaimer, the term of this patent is extended or adjusted under 35 U.S.C. 154(b) by 344 days.

(21) Appl. No.: 17/509,225

(22) Filed: Oct. 25, 2021

(65) Prior Publication Data
US 2023/0125273 A1    Apr. 27, 2023

(51) Int. Cl.
| | |
|---|---|
| *G06Q 30/016* | (2023.01) |
| *G06F 40/263* | (2020.01) |
| *G06F 40/30* | (2020.01) |
| *G06Q 10/0631* | (2023.01) |
| *G06Q 30/0201* | (2023.01) |
| *G06Q 40/02* | (2023.01) |
| *G07C 11/00* | (2006.01) |
| *G10L 15/00* | (2013.01) |
| *G10L 15/18* | (2013.01) |

(Continued)

(52) U.S. Cl.
CPC ......... *G06Q 30/016* (2013.01); *G06F 40/263* (2020.01); *G06F 40/30* (2020.01); *G06Q 10/06311* (2013.01); *G06Q 30/0201* (2013.01); *G06Q 40/02* (2013.01); *G07C 11/00* (2013.01); *G10L 15/005* (2013.01); *G10L 15/1815* (2013.01); *G10L 15/22* (2013.01); *G07C 2011/04* (2013.01); *G10L 15/30* (2013.01); *H04M 3/5166* (2013.01)

(58) Field of Classification Search
None
See application file for complete search history.

(56) References Cited

U.S. PATENT DOCUMENTS

| | | | |
|---|---|---|---|
| 9,008,632 B1 * | 4/2015 | Kassim | H04M 3/2281 455/414.3 |
| 10,135,989 B1 * | 11/2018 | Indyk | G10L 15/14 |

(Continued)

FOREIGN PATENT DOCUMENTS

JP    2005258600 A  *  9/2005

*Primary Examiner* — Mehmet Yesildag
(74) *Attorney, Agent, or Firm* — TROUTMAN PEPPER LOCKE LLP; Christopher J. Forstner; John A. Morrissett (57) ABSTRACT

Disclosed embodiments may include a queue management system. The system may receive one or more utterances comprising a customer intent from a user device, determine a first queue from a plurality of queues in which to place the user based on the user intent, and receive first urgency data comprising battery indication data from the user device. The system may then determine, using a machine learning model, a first dynamic priority score for the user based on the user intent and the first urgency data including battery indication data associated with the user device. Based on the first dynamic priority score for the user, the system may assign an initial user-specific position within the first queue to the user that differs from a default initial position in the first queue. Based on updated urgency data, the system may dynamically update the user's position to a second user-specific position.

20 Claims, 3 Drawing Sheets

(51) Int. Cl.
  *G10L 15/22*  (2006.01)
  *G10L 15/30*  (2013.01)
  *H04M 3/51*  (2006.01)

(56) References Cited

U.S. PATENT DOCUMENTS

| | | |
|---|---|---|
| 10,547,748 B1 | 1/2020 | Merritt |
| 10,565,529 B1 | 2/2020 | Merritt |
| 10,832,697 B2 * | 11/2020 | Giancarlo ............... G10L 25/48 |
| 10,860,937 B1 | 12/2020 | Merritt |
| 10,909,463 B1 | 2/2021 | Merritt |
| 10,997,506 B1 | 5/2021 | Merritt |
| 2009/0232294 A1 * | 9/2009 | Xie ................... H04M 3/42068 379/266.01 |

* cited by examiner

URGENCY-BASED QUEUE MANAGEMENT SYSTEMS AND METHODS

FIELD

The disclosed technology relates to queue management systems and methods, including those for assigning a position within a queue (e.g., structured or unstructured) to a user or customer. In particular, the disclosed technology relates to queue management systems and methods for automatically assigning a position within a mobile, virtual, or online queue to a user based on a dynamic priority score that may take into account a remaining battery life of the user's device.

BACKGROUND

While organizations commonly provide a call center to assist customers with issues with products, services, payments, etc., call center representatives are frequently bombarded with unhappy customers who may take their business elsewhere because of a long wait in a queue for an urgent customer service issue. Commonly, these organizations employ queues where customers are placed in line based on their order of calling. Thus, these organizations place urgent calls (e.g., those based on customer needs and/or customer device limitations) at the end of a queue just like non urgent calls.

Accordingly, there is a need for improved customer service systems that dynamically determine a position within a queue for a user based on the urgency of their call and other factors. Embodiments of the present disclosure are directed to this and other considerations.

SUMMARY

Disclosed embodiments may include a queue management system for assigning a position in a queue to a user. The system may include one or more processors, and memory in communication with the one or more processors and storing first instructions that are configured to cause the system to perform a method for assigning a position within the queue to a user. For example, the system may receive one or more utterances comprising a user intent (e.g., a request to return a purchased item) from a user device (e.g., the user's smartphone), determine a first queue (e.g., the queue for returns) from a plurality of queues in which to place the user based on the user intent, and receive first urgency data comprising battery indication data from the user device. The system may then determine, using a machine learning model, a first dynamic priority score for the user based on the user intent and the first urgency data including battery indication data associated with the user device. Based on the first dynamic priority score for the user, the system may assign an initial user-specific position within the first queue to the user that differs from a default initial position (e.g., last or in order that the call was received) in the first queue.

Disclosed embodiments may include a system for assigning a user a position in a queue. The system may include one or more processors, and memory in communication with the one or more processors and storing first instructions that are configured to cause the system to perform a method for assigning a user a position within a queue. For example, the system may receive, from a user device associated with a user, one or more utterances comprising a user intent, determine a first queue from a plurality of queues in which to place the user based on the user intent, and receive first urgency data. The first urgency data may include battery indication data from the user device, as noted for the prior embodiment, location data of the user device (e.g., GPS position of user device), recent account activity data (e.g., recent transactions or attempted in-store transactions), time of day data, and/or authorization data. The system may determine, using a machine learning model, a first dynamic priority score for the user based on the user intent and the first urgency data and assign an initial user-specific position within the first queue to the user based on the first dynamic priority score for the user, the initial user-specific position being different from a default initial position in the first queue.

Disclosed embodiments may include a method for assigning a user a position in a queue. For example, the method may include receiving, from a user device associated with a user, one or more utterances comprising a user intent, determining a first queue from a plurality of queues in which to place the user based on the user intent, and receiving first urgency data comprising battery indication data from the user device. The method may include determining, using a machine learning model, a first dynamic priority score for the user based on the user intent and the first urgency data and assigning an initial user-specific position within the first queue to the user based on the first dynamic priority score for the user, the initial user-specific position being different from a default initial position in the first queue.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for assigning a user-specific queue position based on a dynamic priority score. The systems and methods described herein are necessarily rooted in computer and technology as they relate to automatically assigning a customer a queue based on their intent and assigning a position within that queue based on a determining a dynamic priority score for the user, which takes into account urgency data (e.g., battery indication data from the user device, location data, recent account activity data, time of day data, and/or authorization data). In some instances, the system utilizes a machine learning model to determine the dynamic priority score for the user based on received urgency data. Machine learning models are a unique computer technology that involves training the models to complete tasks, such as labeling, categorizing, identifying, or determining whether a customer's associated urgency data (e.g., battery indication data) is associated with a higher or lower score. Importantly, examples of the present disclosure improve the speed and accuracy with which computers can assign (or reassign) a customer a specific queue position in an assigned queue rather than a static default position.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
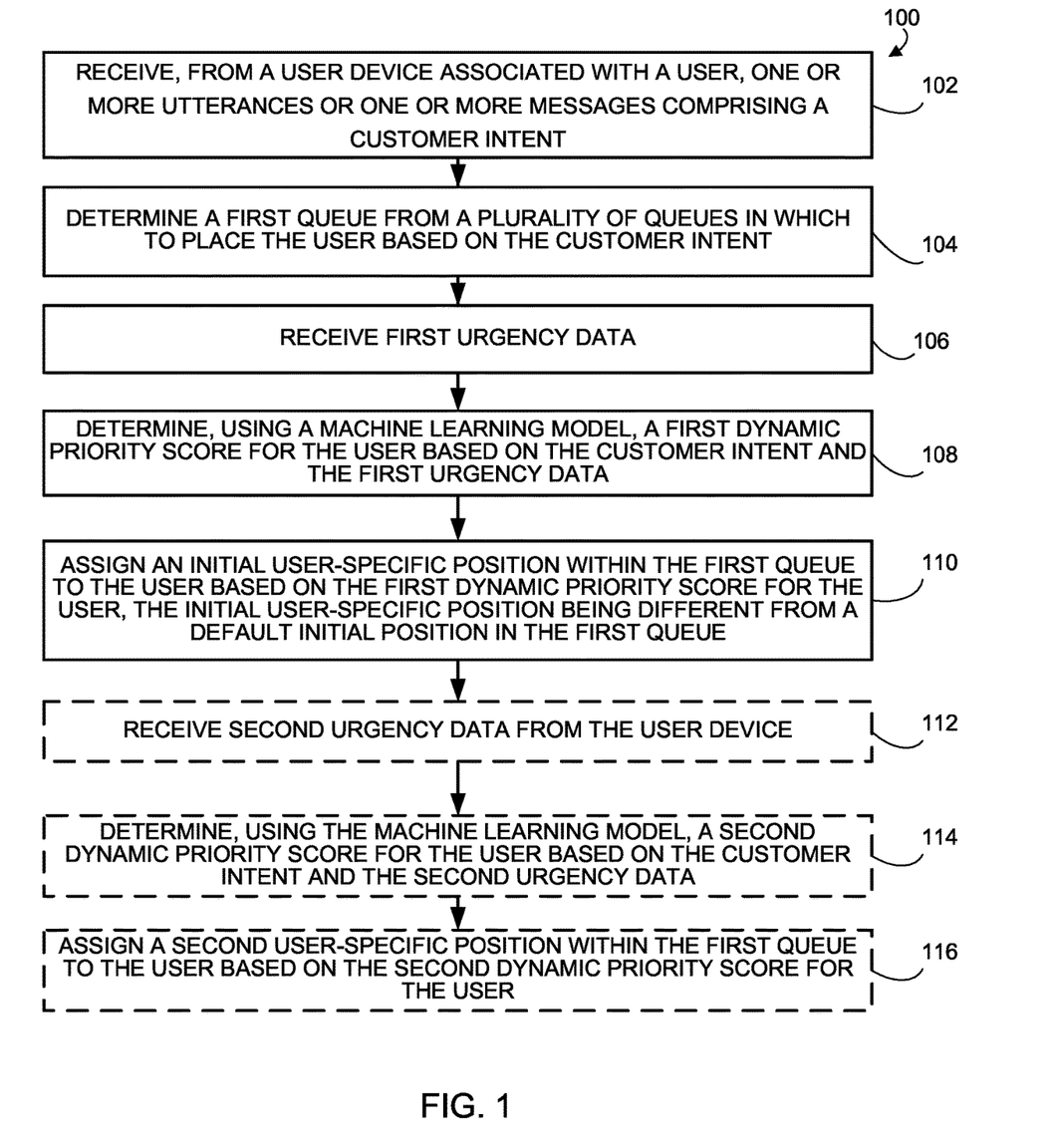
FIG. 1 is a flow diagram illustrating an exemplary method for assigning a user-specific queue position, in accordance with certain embodiments of the disclosed technology.

FIG. 1 is a flow diagram illustrating an exemplary method for assigning a user-specific queue position, in accordance with certain embodiments of the disclosed technology. The steps of method 100 may be performed by one or more components of the system 300 (e.g., queue positioning system 220, web server 310, or call center server 330 of queuing system 308 or user device 302), as described in more detail with respect to FIGS. 2 and 3. Although method 100 is described as being performed by the queue positioning system 220, other devices such as the user device 302 may perform similar steps, or some hybrid approach.

In block 102, the queue positioning system 220 may receive one or more utterances comprising a user intent, from a user device 302 associated with a user. For example, the user may call a phone number associated with a customer service line for a company associated with the queue positioning system 220. Once connected, a call center server using interactive voice response (IVR) may prompt the user to speak with a noise (e.g., a beep) or a welcome prompt (e.g., the system speaking hello). The user may, in response to the prompt, state the reason or intent for calling by speaking one or more utterances, which is captured by the user device and transmitted to the queue positioning system 220 via the phone call. In some embodiments, the user may be given choices for why they call (e.g., "press or say one if you're calling to reset your password" or "press or say 2 is your calling to check your account balance"). In some embodiments, the voice call from the user is initiated via a mobile application link or weblink instead of dialing a number and connects to the queue positioning system 220 through without going through traditional phone networks. In other embodiments, an IVR may simply ask the user why he or she is calling.

In block 104, the queue positioning system 220 may determine a first queue from a plurality of queues in which to place the user based on the user intent. In some embodiments, the user has selected an option from enumerated options provided by the IVR and the center server 220 and/or the queue positioning system 220. In other embodiments, the user is not prompted with options via the IVR, and the spoken utterances are provided to a trained machine learning model to classify the user's utterances to a particular intent. Whether the intent is recognized via a machine learning model, choosing an option presented by an IVR system, or by some other means, the queue positioning system 220 determines a queue from a plurality of queues to place the user in based on their recognized intent. For example, the user may be assigned a password change queue if the user's intent is to change their password due to being locked out based on too many incorrect password submissions.

In some embodiments, the queue is selected based on a user's spoken language. When a user speaks one or more utterances, a machine learning model or other algorithm recognizes that the user is speaking in Spanish and assigns the user to a Spanish speaking queue.

In some embodiments, the queue positioning system 220 may determine whether the user's intent involves an escalation issue. For example, if the user selects fraud as a reason for calling, the queue positioning system 220 may place the user in a fraud queue that is different from other traditional queues. In another example, if the user speaks one or more utterances and the system recognizes fraud in the one or more utterance using a machine learning model or other means, then the queue positioning system 220 may place the user in the fraud queue.

In some embodiments, there may be a plurality of queues. For example, there may be a general queue (e.g., balance check, transfer help, password reset), an escalation queue (e.g., fraud), and one or more special language queues (e.g., Spanish, Italian, German, Japanese, Chinese) for general issues and one or more special language queues for escalation issues. The queue positioning system 220 and/or the call center server 330 may recognize the user's intent and the language used in the one or more utterances to decide which queue to place the user in.

In block 106, the queue positioning system 220 may receive first urgency data. The urgency data may include battery indication data from the user device. For example, the battery indication data may indicate to the queue positioning system 220 the approximate amount (e.g., percentage or, amount of talk time, etc.) of about battery charge the user has left in the user device. In other embodiments, the queue positioning system 220 may receive a percent of battery life remaining, a capacity of the battery of the user device, and the current power draw of the user device. Based on this information, the queue positioning system 220 may determine the amount of time the user device can be on hold. In some embodiments, the battery indication data may be captured via a company's mobile app from which the customer/user is initiating a call (e.g. clicking "contact us now"). The estimation of "remaining battery time" may be calculated on the phone and communicated to a backend server (e.g., queue positioning system 220 or another system) via the (mobile) application. Upon receiving the call, the queue positioning system 220 can query the same backend server to fetch additional information about the caller, including their latest battery information. In some embodiments, the battery indication data or other device health information may be communicated by having the application embed a particular extension or sequence of keys to indicate to the system this is a high urgency call. Or having the application display/call a separate number altogether based on urgency. In other words, the application on the user device 302 may determine/retrieve the current battery level of the user device 302 and determine whether that warrants an urgency status requiring the user device 302 to call an urgent number or indication to the queue positioning system 220 that call is urgent or even a particular battery level. In some embodiments, the battery indication data may include an indication on whether the user device 302 is charging. If the battery indication data indicates the user device 302 is charging, the queue positioning system 220 may determine that the battery level indication is not a factor in considering priority of the caller/user of user device 302.

The first urgency data may include location data, recent account activity data, time of day data, authorization data or combinations thereof. The location data may include location associated with a customer's account (e.g., address), area code of phone number, global positioning system (GPS) data associated with the current position of the user device, a flag in the user's account indicating they are traveling, or combinations thereof. In some embodiments, the location data may include roaming indication on whether the user device 302 is roaming such that the device would be draining battery life more quickly than normal. In other embodiments, the first urgency data may include network data that indicates whether the user is accessing a local network (e.g., WiFi®) or a cellular network. When the user is accessing the cellular network, the user device 302 may drain its battery faster.

The recent account activity data may include recent purchase from a credit or checking account, error messages received in accessing or navigating the mobile application or web site, attempted transactions such as money transfers, recent transactions (e.g., attempted online purchases or attempted in-person purchases) or combinations thereof.

With time of day data, the queue positioning system 220 may determine in block 108 that the current time of day is within an urgent threshold period (e.g., middle of the night) compared to a call during the middle of the day.

Authorization data may include customer pattern data. For example, if a user typically calls to check account balance after making a money transfer then similar actions may be received to indicate that the user is conducting similar patterns so it should not be treated as an urgent fraud-based call. Similarly, if the user is calling from a number that is not associated with the user's account, the call may be flagged as a potential fraud call and the determined first dynamic priority score may be skewed higher by the machine learning model than if the user called from the mobile application or a known telephone number.

Other data urgency data may include frequency of past calls. For example, if the user has called three times, the third call may be marked as more urgent than the first call.

In block 108, the queue positioning system 220 may determine, using a first machine learning model, a first dynamic priority score for the user based on the user intent and the first urgency data.

For example, if the queue positioning system 220 may determine/generate a higher score for a user with battery indication data indicating the user has 5 minutes of battery life left than a user with 1 hour or more of battery life left. As another example, the queue positioning system 220 may determine/generate a higher score for a user with a recent attempted in-store purchase as recent activity data than if there was no recent activity data or the recent activity data indicated an attempted online purchase. As a further example, the queue positioning system 220 may determine/generate a higher score if the user's device is located a predetermined distance from their address on file based on GPS data than if the user's device location is less than the predetermined distance from the user's address.

In some embodiments, a second machine learning model may detect a user's sentiment (e.g., normal, distressed, etc.) from the one or more utterances. The detected sentiment may be provided to the first machine learning model for determining the first dynamic priority score. For example, if the user is detected to be distressed by the second machine learning model, the first machine learning model may determine a higher score than if the user is not distressed.

The first and the second machine learning models may be trained via supervised and/or unsupervised learning. The first and/or the second machine learning models may be fed labeled transcripts of voice recordings that are preprocessed through a natural language processing model. After calls, a servicing agent (a human) may self report a call urgency and/or a user sentiment, which is fed to the first and/or second machine learning model, respectively. Users may be presented with a survey (via notification, text message, email, and/or a graphical user interface) to request user to rank the urgency of their call and/or their sentiment, which is fed to the first and/or second machine learning models. The first and/or second machine learning models may be trained by randomly sampling calls between users and servicing agent to rate call urgency and/or user sentiment.

In block 110, the queue positioning system 220 may assign an initial user-specific position within the first queue to the user based on the first dynamic priority score for the user, the initial user-specific position being different from a default initial position in the first queue. For example, if the user was determined to have a score of 90 (e.g., due to having 5 minutes of battery life left), the queue positioning system 220 may assign the caller as the next in queue position (position 1 out of 15). However, if the user was determined to have a score of 70 (e.g., due to having 2 hours of battery life left and a recent online attempted purchase), the user may be placed in queue position 7 out of 15.

In optional block 112, the queue positioning system 220 may receive second urgency data from the user device. For example, the queue positioning system 220 may receive updated battery indication data indicating the battery life of the user's device has dropped from 2 hours of battery life left to 15 minutes of battery life left.

In optional block 114, the queue positioning system 220 may determine, using the first machine learning model, a second dynamic priority score for the user based on the user intent and the second urgency data. The second dynamic priority score may simply be an updated first dynamic priority score for the user based on the new (second) urgency data. For example, if the user's battery life went from 2 hours of life left to 15 minutes of life left, the user's dynamic priority score may climb from 70 to 85

In optional block 116, the queue positioning system 220 may reassign the user a second user-specific position within the first queue based on the second dynamic priority score for the user. For example, the queue positioning system 220 may reassign the user from the 12th position out of 15 positions in the assigned queue to the $1^{st}$ position based on the user's score climbing from 70 to 90.

In some embodiments, the queue positioning system 220 may iteratively determine an updated dynamic priority score for a plurality of the callers and dynamically reassign positions in the queue based on each caller's score to maximize the likelihood of each caller reaching a customer service agent (a) before his phone dies and/or (b) with sufficient time to complete the customer service call based on the estimated duration based on the user intent. For example, the queue positioning system 220 may track an average call time for each queue and the battery life of the user device 302. If the queue positioning system 220 determines that the user device 302 will die before reaching a customer service agent and/or completing an average call length with a servicing agent based on the user's current queue position, then the queue positioning system 220 will determine an updated dynamic priority score for the user based on not only the remaining battery life of the user device 302 but also the amount of time it will take the user to reach a customer service agent and complete an average call. Estimated service time can either be a built in part of the first model (e.g. influence the urgency score) or be taken as a separate consideration in the queuing logic—e.g. used in combination with the urgency score to sort a queue system.

In some embodiments, messaging via an application, website, text messaging service (e.g., short message service (SMS) or multimedia messaging service (MMS)) rather than via a voice call may be used. For example, the queue positioning system 220 may work with a chat system to converse with a live agent via chat. The chat system may be a part of or a separate system similar to queue positioning system 220. The method would work similarly as described above except the system would detect user intent and/or language based on the queue positioning system 220 receiving messages from user via user device 302.

Figure 2:
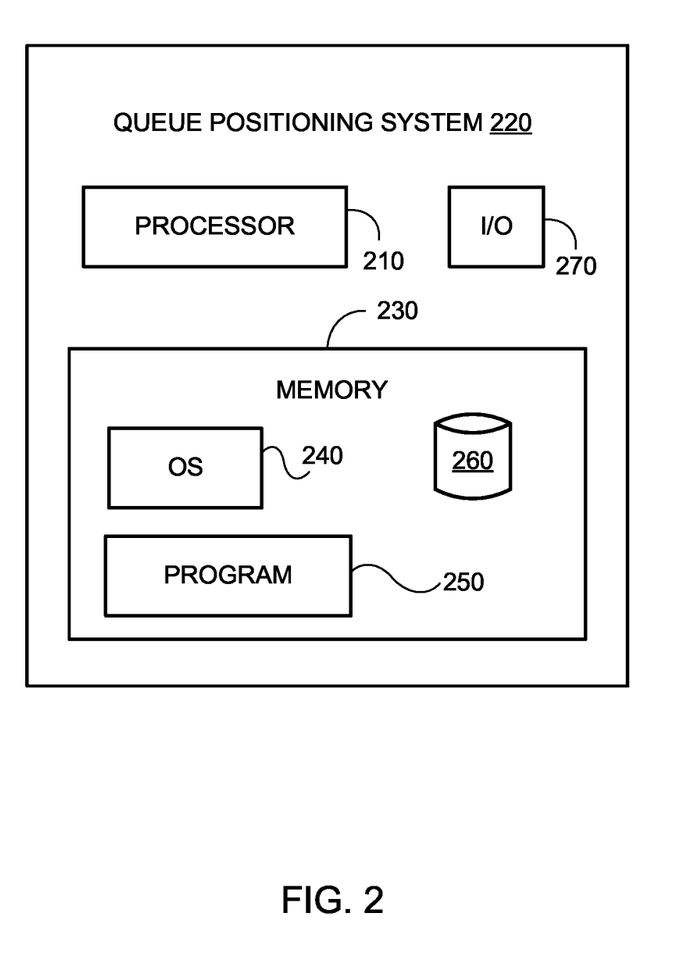
FIG. 2 is a block diagram of an example queue positioning system used to assign a user-specific queue position, according to an example implementation of the disclosed technology.
Figure 3:
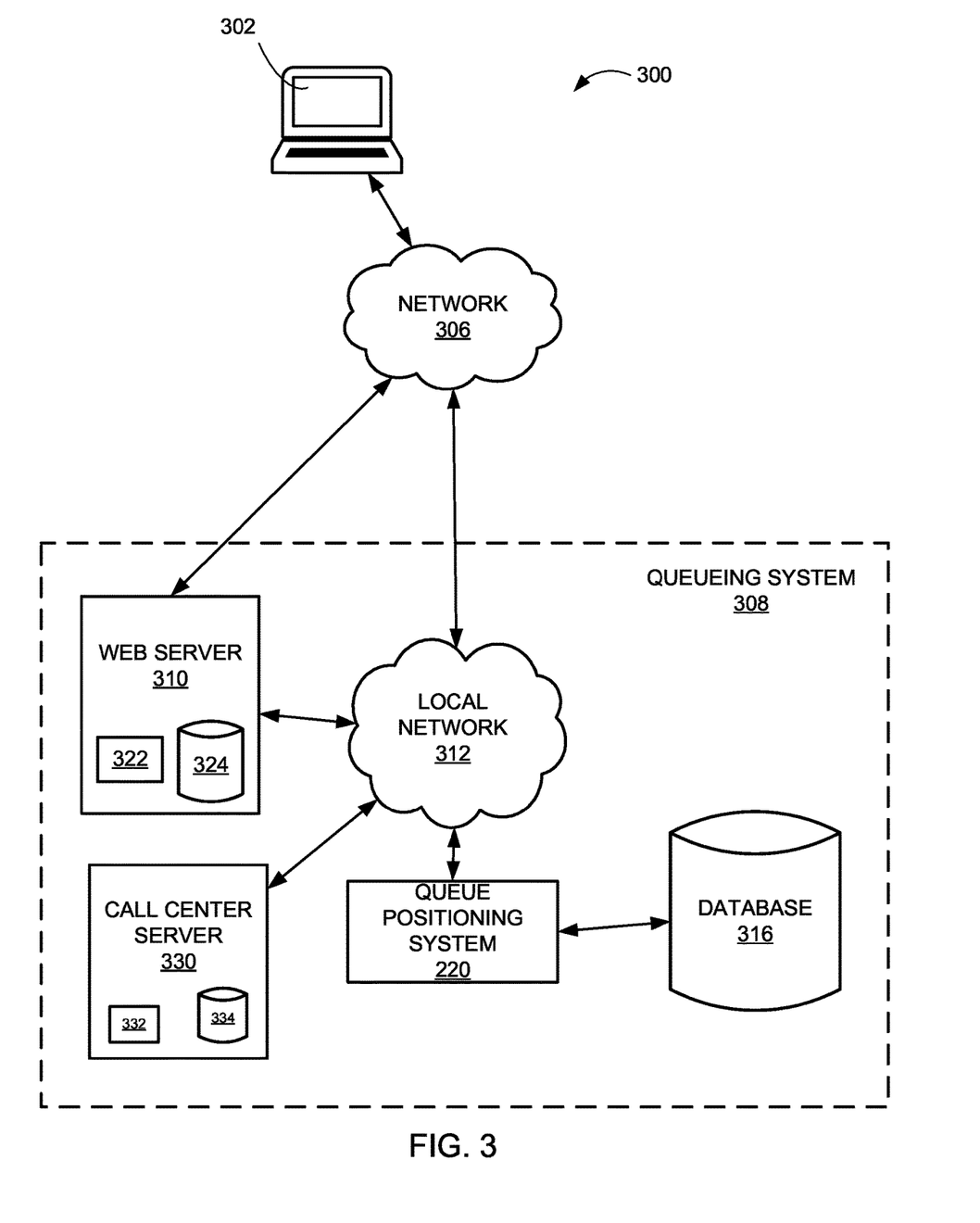
FIG. 3 is a block diagram of an example system that may be used to assign a user-specific queue position, according to an example implementation of the disclosed technology.

FIG. 2 is a block diagram of an example queue positioning system 220 used to assign a user-specific queue position, according to an example implementation of the disclosed technology. According to some embodiments, the user device 302, web server 310, call center server 330, as depicted in FIG. 3 and described below, may have a similar structure and components that are similar to those described with respect to queue positioning system 220 shown in FIG. 2. As shown, the queue positioning system 220 may include a processor 210, an input/output ("I/O") device 270, a memory 230 containing an operating system ("OS") 240 and a program 250. In certain example implementations, the queue positioning system 220 may be a single server or may be configured as a distributed computer system including multiple servers or computers that interoperate to perform one or more of the processes and functionalities associated with the disclosed embodiments. In some embodiments, queue positioning system 220 may be one or more servers from a serverless or scaling server system. In some embodiments, the queue positioning system 220 may further include a peripheral interface, a transceiver, a mobile network interface in communication with the processor 210, a bus configured to facilitate communication between the various components of the queue positioning system 220, and a power source configured to power one or more components of the queue positioning system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the queue positioning system 220 may include one or more storage devices configured to store information used by the processor 210 (or other components) to perform certain functions related to the disclosed embodiments. In one example, the queue positioning system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the queue positioning system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the queue positioning system 220 may include the memory 230 that may include one or more programs 250 to perform one or more functions of the disclosed embodiments. For example, in some embodiments, the queue positioning system 220 may additionally manage dialogue and/or other interactions with the customer via a program 250.

The processor 410 may execute one or more programs located remotely from the troubleshooting system 420. For example, the troubleshooting system 420 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a queue positioning database 260 for storing related data to enable the queue positioning system 220 to perform one or more of the processes and functionalities associated with the disclosed embodiments.

The queue positioning database 260 may include stored data relating to one or more intents of the users, user profile information, urgency data associated with one or more users, a list of a plurality of queues, and mapping data of the one or more intents of the user to one or more queues. According to some embodiments, the functions provided by the queue positioning database 260 may also be provided by a database that is external to the queue positioning system 220, such as the database 316 as shown in FIG. 3.

The queue positioning system 220 may also be communicatively connected to one or more memory devices (e.g., databases) locally or through a network. The remote memory devices may be configured to store information and may be accessed and/or managed by the queue positioning system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The queue positioning system 220 may also include one or more I/O devices 270 that may comprise one or more interfaces for receiving signals or input from devices and providing signals or output to one or more devices that allow data to be received and/or transmitted by the queue positioning system 220. For example, the queue positioning system 220 may include interface components, which may provide interfaces to one or more input devices, such as one or more keyboards, mouse devices, touch screens, track pads, trackballs, scroll wheels, digital cameras, microphones, sensors, and the like, that enable the queue positioning system 220 to receive data from a user (such as, for example, via the user device 302).

In example embodiments of the disclosed technology, the queue positioning system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the queue positioning system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the queue positioning system 220 may include a greater or lesser number of components than those illustrated.

FIG. 3 is a block diagram of an example system 300 that may be used to assign a user-specific queue position, according to an example implementation of the disclosed technology. The components and arrangements shown in FIG. 3 are not intended to limit the disclosed embodiments as the components used to implement the disclosed processes and features may vary. As shown, user queuing system 308 may interact with a user device 302 via a network 306. In certain example implementations, the user queuing system 308 may include a local network 312, a queue positioning system 220, a web server 310, a call center server 330, and a database 316.

In some embodiments, a user may operate the user device 302. The user device 302 can include one or more of a mobile device, smart phone, general purpose computer, tablet computer, laptop computer, telephone, PSTN landline, smart wearable device, voice command device, other mobile computing device, or any other device capable of communicating with the network 306 and ultimately communicating with one or more components of the queueing system 508. In some embodiments, the user device 302 may include or incorporate electronic communication devices for hearing or vision impaired users.

Customers or users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the queueing system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN.

Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network using a public network, and/or other suitable connection(s) that enable(s) components in the system 300 environment to send and receive information between the components of the system 300. The network 306 may also include a public switched telephone network ("PSTN") and/or a wireless network.

The queuing system 308 may be associated with and optionally controlled by one or more entities such as a business, corporation, individual, partnership, or any other entity that provides one or more of goods, services, and consultations to individuals such as customers. In some embodiments, the queuing system 308 may be controlled by a third party on behalf of another business, corporation, individual, partnership. The queueing system 308 may include one or more servers and computer systems for performing one or more functions associated with products and/or services that the organization provides.

Web server 310 may include a computer system configured to generate and provide one or more websites accessible to customers or users, as well as any other individuals involved in queuing system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems (e.g., queue positioning system 220) of system 300. In some embodiments, web server 310 may host websites or applications that may be accessed by the user device 302. For example, web server 310 may host a financial service provider website that a user device may access by providing an attempted login that are authenticated by the queue positioning system 220. According to some embodiments, web server 310 may include software tools, similar to those described with respect to user device 302 above, that may allow web server 310 to obtain network identification data from user device 302.

The call center server 330 may include a computer system configured to receive, process, and route telephone calls and other electronic communications between a customer or user operating a user device 302 and the queue positioning system 220. The call center server 330 may have one or more processors 332 and one or more call center databases 334, which may be any suitable repository of call center data. Information stored in the call center server 330 may be accessed (e.g., retrieved, updated, and added to) via the local network 312 (and/or network 306) by one or more devices of the system 300. In some embodiments, the call center server processor 332 may be used to implement an interactive voice response (IVR) system that interacts with the user over the phone or via a voice/audio call portion of an associated mobile application on the user device 302.

The local network 312 may include any type of computer networking arrangement used to exchange data in a localized area, such as WiFi, Bluetooth™ Ethernet, and other suitable network connections that enable components of the queueing system 308 to interact with one another and to connect to the network 306 for interacting with components in the system 300 environment. In some embodiments, the local network 312 may include an interface for communicating with or linking to the network 306. In other embodiments, certain components of the queuing system 308 may communicate via the network 306, without a separate local network 306.

In accordance with certain example implementations of the disclosed technology, the user queuing system 308 may include one or more computer systems configured to compile data from a plurality of sources the queue positioning system 220, web server 310, call center server 330, and/or the database 316. The queue positioning system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Although the preceding description describes various functions of a web server 310, a queue positioning system 220, a call center server 330, and a database 316, in some embodiments, some or all of these functions may be carried out by a single computing device or a plurality of computing devices in a (cloud) serverless system.

EXEMPLARY USE CASE

A user, after attempting (and failing) to make an online purchase using his credit card, wishes to call the customer service number associated with the credit card. When the user calls in via the Banking mobile application associated with the user's credit card and on the user device 302, the call center server 330 or the queue positioning system 220 answers the call and provides the user with an IVR prompt asking the user what the reason for his call is. It is at this point (and throughout the call while the application is running in the background) that any device information (e.g., battery level indication described below) can be transmitted to the queue positioning system 220 (e.g., banking backend servers). The user speaks into his user device to explain the reason for his call by stating "My credit card was denied when I attempted to make a purchase." The queue positioning system 220 then receives the spoken reasons and determines which queue to place the user in. Here, based on the utterances received from the user device 302, the queue positioning system 220 determines that the user speaks English and has an issue with a denied purchase, so the queue positioning system assigns the user to the general English speaking queue. The user's issues can be further corroborated or even learned exclusively by information on the backend (e.g., queue positioning system 220) about the user's recent activity. The queue positioning system 220 also receive a battery level indication from the user device 302 that indicates the user has 45 minutes before his phone dies.

The queue positioning system 220 determines using a machine learning model that the user has a dynamic priority score of 78 based on the battery indication data and the recently denied online purchase. Based on the high dynamic priority score of 78, the queue positioning system 220 may assign the user the position 5 out of 15 in the normal English speaking queue. However, a few minutes later the queue positioning system 220 may receive an updated battery indication level from the user device 302 that indicates the user has 10 minutes of battery life left for the user device 302. In response, the queue positioning system 220 may determine an updated dynamic priority score of 92 based on the updated battery indication level. In turn, the queue positioning system 220 may move the user from the fifth position to the next call position (i.e., the $1^{st}$ position out of 15 callers). Essentially, the queue positioning system 220 may iteratively determine an updated dynamic priority score for a plurality of the callers and dynamically reassign positions in the queue based on each caller's score to maximize the likelihood of each caller reaching a customer service agent (a) before his phone dies and/or (b) with sufficient time to complete the customer service call based on the estimated duration based on the user intent.

In some examples, disclosed systems or methods may involve one or more of the following clauses:

Clause 1: A system comprising: one or more processors; and memory in communication with the one or more processors and storing instructions that, when executed by the one or more processors, are configured to cause the system to: receive, from a user device associated with a user, one or more utterances comprising a user intent; determine a first queue from a plurality of queues in which to place the user based on the user intent; receive first urgency data comprising battery indication data from the user device; determine, using a machine learning model, a first dynamic priority score for the user based on the user intent and the first urgency data; and assign an initial user-specific position within the first queue to the user based on the first dynamic priority score for the user, the initial user-specific position being different from a default initial position in the first queue.

Clause 2: The system of clause 1, wherein the instructions are further configured to cause the system to: detect a language associated with the one or more utterances; and assign the user the first queue out of a plurality of queues based on the user intent and language.

Clause 3: The system of clause 1, wherein the first urgency data further comprises location data.

Clause 4: The system of clause 1, wherein the first urgency data further comprises recent account activity data.

Clause 5: The system of clause 1, wherein the first urgency data further comprises location data recent account activity data, time of day data, authorization data, or combinations thereof.

Clause 6: The system of clause 1, wherein the instructions are further configured to cause the system to: receive second urgency data from the user device; determine, using the machine learning model, a second dynamic priority score for the user based on the user intent and the second urgency data; and reassign the user a second user-specific position within the first queue based on the second dynamic priority score for the user.

Clause 7: The system of clause 6, wherein the second urgency data comprises location data, battery indication data, recent account activity data, time of day data, authorization data, or combinations thereof.

Clause 8: A system, comprising: one or more processors; and memory in communication with the one or more processors and storing instructions that are configured to cause the system to: receive, from a user device associated with a user, one or more messages comprising a user intent; determine a first queue from a plurality of queues in which to place the user based on the user intent; receive first urgency data from the user device; determine, using a machine learning model, a first dynamic priority score for the user based on the user intent and the first urgency data; and assign an initial user-specific position within the first queue to the user based on the first dynamic priority score for the user, the initial user-specific position being different from a default initial position in the first queue.

Clause 9: The system of clause 8, wherein the instructions are further configured to cause the system to: detect a language associated with the one or more messages; and assign the user the first queue out of a plurality of queues based on the user intent and language.

Clause 10: The system of clause 8, wherein the first urgency data comprises location data.

Clause 11: The system of clause 8, wherein the first urgency data comprises battery indication data.

Clause 12: The system of clause 8, wherein the first urgency data comprises recent account activity data.

Clause 13: The system of clause 12, wherein the recent account activity data comprises a transaction indication and call indication within a predetermined time period.

Clause 14: The system of clause 8, wherein the first urgency data comprises location data, battery indication data, recent account activity data, time of day data, authorization data, or combinations thereof.

Clause 15: The system of clause 8, wherein the instructions are further configured to cause the system to: receive second urgency data from the user device; determine, using the machine learning model, a second dynamic priority score for the user based on the user intent and the second urgency data; and reassign the user a second user-specific position within the first queue based on the second dynamic priority score for the user.

Clause 16: The system of clause 15, wherein the second urgency data comprises location data, battery indication data, recent account activity data, time of day data, authorization data, or combinations thereof.

Clause 17: A method comprising: receiving, from a user device associated with a user, one or more utterances or messages comprising a user intent; determining a first queue from a plurality of queues in which to place the user based on the user intent; receiving first urgency data from the user device; determining, using a machine learning model, a first dynamic priority score for the user based on the user intent and the first urgency data; and assigning an initial user-specific position within the first queue to the user based on the first dynamic priority score for the user, the initial user-specific position being different from a default initial position in the first queue.

Clause 18: The method of clause 17, further comprising detecting a language associated with the one or more utterances or messages; and assigning the user the first queue out of a plurality of queues based on the user intent and language.

Clause 19: The method of clause 17, further comprising: receiving second urgency data from the user device; determining, using the machine learning model, a second dynamic priority score for the user based on the user intent and the first urgency data; and reassigning the user a second user-specific position within the first queue based on the second dynamic priority score for the user.

Clause 20: The method of clause 19, wherein the second urgency data comprises location data, battery indication data, recent account activity data, time of day data, authorization data, or combinations thereof.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultramobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
memory in communication with the one or more processors and storing instructions that, when executed by the one or more processors, are configured to cause the system to:
receive, from a voice call initiated via a mobile application of a user device associated with a user, one or more utterances comprising a user intent;
determine a first queue from a plurality of queues in which to place the user based on the user intent;
receive first urgency data comprising battery indication data from the user device via the mobile application of the user device, the battery indication data being captured by the mobile application of the user device and comprising a battery level indication and an indication of whether the user device is charging;
determine, using a machine learning model, a first dynamic priority score for the user based on the user intent and the first urgency data, wherein the machine learning model is configured to not consider the battery level indication when determining a dynamic priority score when received urgency data provides an indication that the user device is charging;
assign an initial user-specific position within the first queue to the user based on the first dynamic priority score for the user, the initial user-specific position being different from a default initial position in the first queue; and
iteratively:
receive updated urgency data from the user device, wherein the updated urgency data is obtained by the mobile application of the user device in real time during the voice call;
determine, using the machine learning model, an updated dynamic priority score for the user based on the user intent and the updated urgency data;
determine whether to assign a new user-specific position within the first queue to the user based on the updated dynamic priority score; and
dynamically reassign one or more user positions in the first queue in response to determining to assign a new user-specific position within the first queue to the user based on the updated dynamic priority score.

2. The system of claim 1, wherein the instructions are further configured to cause the system to:

detect a language associated with the one or more utterances; and
assign the user the first queue out of a plurality of queues based on the user intent and language.

3. The system of claim 1, wherein the first urgency data further comprises location data.

4. The system of claim 1, wherein the first urgency data further comprises recent account activity data.

5. The system of claim 1, wherein the first urgency data further comprises location data, recent account activity data, time of day data, authorization data, or combinations thereof.

6. The system of claim 1, wherein the instructions are further configured to cause the system to:
receive second urgency data from the user device;
determine, using the machine learning model, a second dynamic priority score for the user based on the user intent and the second urgency data; and
reassign the user a second user-specific position within the first queue based on the second dynamic priority score for the user.

7. The system of claim 6, wherein the second urgency data comprises location data, battery indication data, recent account activity data, time of day data, authorization data, or combinations thereof.

8. The system of claim 1, wherein the first urgency data further comprises one or more of an indication of whether the user device is roaming and an indication of whether the user device is accessing a wireless or cellular network.

9. A system, comprising:
one or more processors; and
memory in communication with the one or more processors and storing instructions that are configured to cause the system to:
receive, from a voice call initiated via a mobile application of a user device associated with a user, one or more messages comprising a user intent;
determine a first queue from a plurality of queues in which to place the user based on the user intent;
receive first urgency data from the user device via the mobile application of the user device, the first urgency data being captured by the mobile application of the user device and comprising a battery level indication and an indication of whether the user device is charging;
determine, using a machine learning model, a first dynamic priority score for the user based on the user intent and the first urgency data, wherein the machine learning model is configured to not consider the battery level indication when determining a dynamic priority score when received urgency data provides an indication that the user device is charging;
assign an initial user-specific position within the first queue to the user based on the first dynamic priority score for the user, the initial user-specific position being different from a default initial position in the first queue; and
iteratively:
receive updated urgency data from the user device wherein the updated urgency data is obtained by the mobile application of the user device in real time during the voice call;
determine, using the machine learning model, an updated dynamic priority score for the user based on the user intent and the updated urgency data;
determine whether to assign a new user-specific position within the first queue to the user based on the updated dynamic priority score; and
dynamically reassign one or more user positions in the first queue in response to determining to assign a new user-specific position within the first queue to the user based on the updated dynamic priority score.

10. The system of claim 9, wherein the instructions are further configured to cause the system to:
detect a language associated with the one or more messages; and
assign the user the first queue out of a plurality of queues based on the user intent and language.

11. The system of claim 9, wherein the first urgency data comprises location data.

12. The system of claim 9, wherein the first urgency data comprises battery indication data.

13. The system of claim 9, wherein the first urgency data comprises recent account activity data.

14. The system of claim 13, wherein the recent account activity data comprises a transaction indication and call indication within a predetermined time period.

15. The system of claim 9, wherein the first urgency data comprises location data, battery indication data, recent account activity data, time of day data, authorization data, or combinations thereof.

16. The system of claim 9, wherein the instructions are further configured to cause the system to:
receive second urgency data from the user device;
determine, using the machine learning model, a second dynamic priority score for the user based on the user intent and the second urgency data; and
reassign the user a second user-specific position within the first queue based on the second dynamic priority score for the user.

17. A method comprising:
receiving, from a voice call initiated via a mobile application of a user device associated with a user, one or more utterances or messages comprising a user intent;
determining a first queue from a plurality of queues in which to place the user based on the user intent;
receiving first urgency data from the user device via the mobile application of the user device, the first urgency data being captured by the mobile application of the user device and comprising a battery level indication and an indication of whether the user device is charging;
determining, using a machine learning model, a first dynamic priority score for the user based on the user intent and the first urgency data, wherein the machine learning model is configured to not consider the battery level indication when determining a dynamic priority score when received urgency data provides an indication that the user device is charging;
assigning an initial user-specific position within the first queue to the user based on the first dynamic priority score for the user, the initial user-specific position being different from a default initial position in the first queue; and
iteratively:
receiving updated urgency data from the user device, wherein the updated urgency data is obtained by the mobile application of the user device in real time during the voice call;

determining, using the machine learning model, an updated dynamic priority score for the user based on the user intent and the updated urgency data;

determining whether to assign a new user-specific position within the first queue to the user based on the updated dynamic priority score; and dynamically reassigning one or more user positions in the first queue in response to determining to assign a new user-specific position within the first queue to the user based on the updated dynamic priority score.

18. The method of claim 17, further comprising detecting a language associated with the one or more utterances or messages; and assigning the user the first queue out of a plurality of queues based on the user intent and language.

19. The method of claim 17, further comprising:

receiving second urgency data from the user device;

determining, using the machine learning model, a second dynamic priority score for the user based on the user intent and the first urgency data; and reassigning the user a second user-specific position within the first queue based on the second dynamic priority score for the user.

20. The method of claim 19, wherein the second urgency data comprises location data, battery indication data, recent account activity data, time of day data, authorization data, or combinations thereof.

* * * * *